United States Patent [19]

Posten

[11] 4,376,175

[45] Mar. 8, 1983

[54] FLOOR CARE COMPOSITIONS

[75] Inventor: Robert J. Posten, Mahwah, N.J.

[73] Assignee: Airwick Industries, Inc., Carlstadt, N.J.

[21] Appl. No.: 156,244

[22] Filed: Jun. 4, 1980

[51] Int. Cl.$^3$ ............................................. C08L 33/00
[52] U.S. Cl. ................................... 523/501; 523/504; 524/462; 524/510; 524/513; 524/539; 524/541
[58] Field of Search ................. 260/29.6 E, 29.6 WB, 260/29.6 NR; 525/153, 154, 185, 241, 222; 523/501, 504; 524/462, 510, 513, 539, 541

[56] References Cited

U.S. PATENT DOCUMENTS

| | | | |
|---|---|---|---|
| 3,503,912 | 3/1970 | Lynch, Jr. | 260/28.5 |
| 3,740,367 | 6/1973 | Windelblech | 260/29.6 |
| 3,790,520 | 2/1974 | Ludwig | 260/29.6 |
| 3,992,335 | 11/1976 | Denissenko et al. | 260/13 |
| 4,071,645 | 1/1978 | Kahn | 427/340 |
| 4,299,749 | 11/1981 | McCarthy et al. | 260/29.6 E |

FOREIGN PATENT DOCUMENTS 437031  3/1972  Australia .

Primary Examiner—Lorenzo B. Hayes
Assistant Examiner—Amelia B. Yarbrough
Attorney, Agent, or Firm—Harry Falber

[57]         ABSTRACT

A composition capable of cleaning and protecting the surface of a substrate and of rendering it shiny, without subsequent polishing, comprising an aqueous system containing, in specified concentrations, a solid film forming high molecular weight acrylic polymer, a non-film forming resinous material, a plasticizing agent, a fluorocarbon surfactant and a blend of ether alcohol component and isopropanol in a pre-determined concentration range, the latter blend and the concentration of alcohol therein being primarily responsible for providing the substantially improved cleaning ability of the instant compositions.

7 Claims, No Drawings

FLOOR CARE COMPOSITIONS

The present invention relates to floor care compositions which, upon application, exhibit excellent cleaning characteristics and which then dry to a substantially clear, polished, protective film, said compositions being particularly applicable for flooring materials provided with a permanent protective coating.

Floor care products are well known. Many of these products are merely detergent compositions applied in aqueous dispersion or diluted in water. Others may contain ammonia or comparable agents. This type of product is solely a cleaning composition which serves to strip or remove the previously applied protective film after dirt has become embedded in the film. The use of this composition requires the subsequent application of a wax formulation to provide a shiny protective film.

On the other hand, numerous floor care agents are known which merely provide the protective film without also functioning as a cleaning and/or stripping agent. Such conventional polishes are solutions, or preferably colloidal suspensions, of waxy materials or polymers in appropriate liquids which, after they have been spread on the floor, either dry to a protective shine or, subsequent to drying, must be mechanically polished so as to display the desired shine. Glossy varnishes are also utilized for similar purposes.

In an attempt to combine these functions, aqueous emulsion compositions have been developed which, when applied to certain surfaces, clean the surface and form glossy films of their own accord. Such products have not, however, provided maximum effectiveness in both of the desired areas, as reflected by such criteria as gloss, dry time, tackiness, dirt pickup, and the like.

The following patents disclose a number of these varied formulations: U.S. Pat. No. 3,992,335 discloses non-aqueous, self-shining floor compositions which contain polymeric film-forming compounds, resins, plasticizers and a solvent mixture of a lower alkanol and a co-solvent. While excellent performance is alleged, the product is a mono-functional product without cleaning capability. U.S. Pat. No. 3,503,912 focuses on leveling agents but discloses polymer emulsion floor polishes in conjunction therewith. Once again, only mono-functional products are disclosed. U.S. Pat. No. 3,912,518 focuses on triazine derivatives and their use in various floor care agents. Emphasis is also placed on non-cleaning compositions. U.S. Pat. No. 4,018,737 discloses emulsions of ethylene polymers and copolymers for use in the formulation of floor polishes. Finally, U.S. Pat. No. 4,071,645 discloses aqueous coating compositions which are again viewed as adaptable for use as household floor polishes.

This pattern of mono-functional floor care compositions has extended to flooring substrates which are identified as "no wax" flooring. Such flooring is provided either with a protective upper coating (e.g. polyurethane) to provide the permanently shiny surface or is prepared in the form of a laminate wherein the upper layer provides the permanent shiny surface. Vinyl laminae generally comprise the latter upper layer. Thus, such compositions either clean the surface or renew the protective shine thereof but do not function in a dual manner to simultaneously clean and renew the surface.

It is, therefore, the primary object of this invention to provide a floor care composition which exhibits excellent cleaning and shining characteristics.

It is a further object to provide such compositions which improve upon the performance characteristics of the prior art materials.

It is another object to provide compositions which function in a cleaning and renewing capacity on "no wax" flooring.

It is still another object to define a solvent system which, within a defined range of relative concentrations, provides the potential for cleaning a wide variety of kitchen soils and dirt.

Various other objects and advantages of the invention will become apparent upon a reading of the following descriptive material.

It has now been surprisingly found that a floor care composition providing excellent cleaning and shining characteristics can be prepared from a blend comprising basically polymeric materials and a specific solvent system. These floor care compositions are thus blends in an aqueous medium, of a solid film forming high molecular weight acrylic polymer, a low molecular weight, non-film forming resinous material, a plasticizing agent, a fluorocarbon surfactant, an ether alcohol and isopropanol. It is primarily the latter blend of ether alcohol and isopropanol in a pre-determined concentration range that determines the excellent and unexpectedly improved cleaning capability. Variation in the isopropanol concentration can be utilized to modify the cleaning characteristics such that virtually all types of soils and dirt can be effectively removed by the instant compositions. These compositions are also effective on a wide variety of flooring surfaces with relative ease of application and minimal post-application care. More specifically, these compositions provide excellent cleaning and protecting characteristics to substrates which exhibit a permanent protective coating.

The high molecular weight acrylic polymer should be independently film forming or capable of being rendered film forming by admixture therewith of a plasticizer. The film former has a molecular weight above about 100,000, is solid and non-volatile and is emulsifiable or dispersible in conventional emulsifying and dispersing agents. Applicable acrylic ester polymers include, for example, polyesters of acrylic and methacrylic acids with alkanols, and preferably lower alkanols. Many synthetic polymer film formers are commercially available as emulsions or dispersions which can be included as part of the coating compositions as is without the addition of any further emulsifying and dispersing agents. Representative examples of such commercially available acrylic polymer and copolymer emulsions or dispersions include, Polymer FXP 1023 supplied by The Richardson Company, Rhoplex B-832, Rhoplex B-1141 and Acrysol WS-24 supplied by Rohm and Haas Company, Richamer R-724 and Richamer R-900 supplied by The Richardson Company, Ionac X-180 and Crilicon 642 supplied by Ionac Chemical, and Neocryl A-602 supplied by Polyvinyl Chemical Industries. The film former is utilized herein in concentrations ranging from about 20.0–50.0%, by weight of the composition.

The resinous material is not film-forming by itself. Its primary function is as a leveling resin and gloss enhancer. The resins are preferably chosen from one of the following commercially available classes: aldehyde/ketone resins; esters of polyacrylic acid and $C_1$–$C_4$ alkanols; polyacrylic resins which are obtained by polymerisation of methyl acrylate, methyl methacrylate, ethyl methacrylate, n-butyl methacrylate or isobutyl methacrylate, or by copolymerisation of n-butyl methacrylate and isobutyl methacrylate, methyl methacrylate and n-butyl methacrylate, methyl methacrylate and isobutyl methacrylate, ethyl methacrylate and n-butyl methacrylate or ethyl methacrylate and isobutyl methacrylate; esters of monomeric resin acids, preferably the esters of colophony resin acids (abietic acid etc.) which possess at least one carboxyl group, esterified with organic compounds possessing at least one hydroxyl group such as, preferably, the lower alkanols ($C_1$–$C_4$); condensation products of monomeric resin acids such as dimerized abietic acid with fumaric or maleic acid (U.S. Pat. No. 2,628,226); polyesters of organic non-resinous polycarboxylic acids, and of monomeric polyhydric alcohols, such as phthalic resins; polycondensates of phenolic compounds with formaldehyde; condensates of melamine with formaldehyde; urea-formaldehyde resins; and styrene resins being the condensation products of styrene and maleic acid anhydride. Alkali-soluble synthetic resins are commercially available as emulsions or dispersions, such as Acrysol 527 supplied by Rohm and Haas Company or SMA 2625 A supplied by ARCO, which can be included as part of the composition as is without the addition of any further emulsifying and dispersing agents. Many of these commercially available compositions typically employ an anionic emulsifying system and have a pH ranging from about 6 to 11 while others may have a pH as low as 3.0 or lower and employ a nonionic emulsifying system. The acrylic polymers are preferred. The resin is utilized in concentrations ranging from about 5.0–20.0% by weight of the composition.

To facilitate film formation, conventional permanent and/or fugitive plasticizers can be included in the composition. Permanent plasticizers, if used in the relatively large proportions, may tend to decrease the wear resistance and water resistance of the resulting film. Therefore, they should be used in relatively small amounts, e.g. a maximum of about 2%, by weight. When the coating composition includes acrylic copolymer film formers which are inherently tough and flexible, fugitive or semifugitive plasticizers, often also referred to as coalescing aids, may be preferred rather than permanent plasticizers. As is well recognized in the art, fugitive plasticizers or coalescing aids serve to partially deform the film formers during the drying, so as to enhance the formation of a smooth, continuous film and then evaporate. When used, the amount of the fugitive plasticizer or coalescing aid, preferably should not be more than about 10%, based on the total weight of the composition, because greater amounts do not provide increased performance benefits. In order to facilitate the initial formation of a continuous film and impart some flexibility in the film, mixtures of fugitive and permanent plasticizers can be used.

Representative examples of suitable fugitive plasticizers include high boiling alcohols and their ethers, such as monoethyl or monomethyl ether of diethylene glycol (Carbitol), ethylene glycol, diethylene glycol, isophorone, benzyl alcohol, and 3-methoxybutanol-1. Representative examples of suitable essentially permanent plasticizers include benzyl butyl phthalate, dibutyl phthalate, dimethyl phthalate, triphenyl phosphate, triethyl phosphate, tributyl phosphate, 2-ethyl hexyl benzyl phthalate, butyl cyclohexyl phthalate, mixed benzoic acid and fatty acid esters of pentaerythritol, poly-(propylene adipate) dibenzoate, diethylene glycol dibenzoate, tetrabutylthiodisuccinate, butyl phthalyl butyl glycolate, acetyl tributyl citrate, dibenzyl sebecate, tricresyl phosphate, toluene ethyl sulfonamide, the di-2-ethylhexyl ester of hexamethylene glycol diphthalate, di-(methylcyclohexyl)-phthalate, tributoxyethyl phosphate, and tributyl phosphate. The particular plasticizer and the amount thereof used are chosen in accordance with the demand for compatability and efficiency in lowering the film-forming temperature. Some plasticizers, such as tributoxyethyl phosphate, also serve as leveling agents.

As a further leveling agent, fluorocarbon surface active agents may be utilized. Commercial surfactants include the Zonyl series supplied by DuPont, the Lodyne series supplied by Ciba-Geigy Corporation and the Fluorad series supplied by 3M Co. The concentration of surfactant will range between 0.01–1.0% by weight of the total composition, the lower amounts being desired in order to prevent foaming.

The ether alcohol functions as a coalescing agent and cosolvent for the system. In its former function, as noted hereinabove with regard to the plasticizing agent, it enhances the formation of a smooth, continuous film. The applicable ether alcohols include, ethylene glycol monomethyl ether, diethylene glycol monoethyl ether, diethylene glycol monoethyl ether, propylene glycol monomethyl ether, dipropylene glycol monomethyl ether, ethylene glycol monoethyl ether, ethylene glycol monobutyl ether or mixtures of at least two of these ether alcohols. The diethylene glycol monoethyl ether is preferred. The ether alcohol will generally be present in a concentration ranging from about 2.0–10.0%, by weight of the total composition.

It is the respective concentrations of ether alcohol and isopropanol that provide the unique cleaning characteristics of the instant compositions. Thus, the isopropanol is present in concentrations ranging from about 2.0–10.0%, by weight of the total composition. Accordingly, the ratio of 0.2:1 to 5:1 of ether alcohol to isopropanol is effective against a wide variety of soils and dirt.

In summary, the film-forming acrylic polymer is present in concentrations ranging from 20.0–50.0%, and preferably 25.0–35.%; the resin material in concentrations ranging from 5.0–20.0%, and preferably 6.0–10.0%; the plasticizer in concentrations ranging from 0.5–2.0%, and preferably 0.5–1.0%; the fluorocarbon surfactant in concentrations ranging from 0.01–1.0%, and preferably 0.02–0.06%; the ether alcohol in concentrations ranging from 2.0–10.0%, and preferably 2.5–4.5%, and the isopropanol in concentrations ranging from about 2.0–10.0%, and preferably 2.5–4.5%; with water comprising the remainder of the composition. Total solids content generally ranges from about 10–20% by weight.

The composition can also contain various optional ingredients. Suitable alkaline or buffering agents, such as borax, sodium hydroxide, potassium hydroxide, ammonia or amines can be added as required to adjust the overall pH of the composition to the desired value, preferably from about 7.5–11.5. Anti-foaming agents, preservatives such as formaldehyde, and fragrances when required to mask the odor of certain other ingredients may also be present.

The floor care composition is preferably prepared by admixing commercially available aqueous emulsions or dispersions of the film former and the resinous materials with the formula water and then admixing the other components. The total amount of each dispersion in water is adjusted to provide the solids content desired in the final product.

While the floor care compositions of the invention can be used on a wide variety of substrates, they are particularly suitable for "no wax" resilient floor coverings, such coverings comprising polyurethane-coated substrates, vinyl laminates, and the like. The compositions may, if desired, also be applied to linoleum and asphalt, vinyl and vinyl-asbestos tiles. The liquid composition is applied to the flooring with a mop or other applicator and then let dry. Further operations, such as rinsing, buffing, and the like, are not required. Rapid dry times can be anticipated. The resulting floor is both clean and protected as a result of the effectiveness of the instant compositions.

The following examples illustrate the preferred embodiments of the invention. In these examples, all parts given are by weight unless otherwise specified.

EXAMPLE I

This example illustrates the preparation of a typical floor care composition of this invention.

The following components were utilized.

|  | parts |
| --- | --- |
| Acrylic polymer emulsion (25% solids)[1] | 6.39 |
| (non-film-forming) | |
| High molecular weight acrylic polymer emulsion (40% solids)[2] | 28.09 |
| Preservative[3] | 0.05 |
| Ammonium hydroxide (to pH 8.2) | 0.16 |
| Diethylene glycol monoethyl ether | 3.77 |
| Isopropanol | 3.11 |
| Tris-butoxyethyl phosphate | 0.62 |
| Fluorocarbon surfactant[4] | 0.03 |
| Water | 57.78 |

[1]Syntran 1535 supplied by Interpolymer Corporation
[2]FXP 1023 supplied by The Richardson Company
[3]Proxcel CRL supplied by ICI Americas
[4]Zonyl FSJ, an emulsion of a fluorocarbon surfactant supplied by duPont.

The water and the respective polymer emulsions were first admixed and the surfactant, plasticizer and solvents were then admixed therewith. The result milky, whitish translucent composition was applied to a white, polyurethane-coated floor tile with a conventional mop applicator. After drying, the tile was exceptionally clean and a clear, colorless, continuous film coating was formed thereon. The film showed a consistant gloss and was resistant to foot traffic over a period of weeks.

EXAMPLES 2-16

The following formulations were prepared in as similar manner to the formulation of Example 1, hereinabove.

| | Parts | | | | | | | | | | | | | | |
|---|---|---|---|---|---|---|---|---|---|---|---|---|---|---|---|
| | 2 | 3 | 4 | 5 | 6 | 7 | 8 | 9 | 10 | 11 | 12 | 13 | 14 | 15 | 16 |
| Water | 47.0 | 46.75 | 49.0 | 49.0 | 49.0 | 42.0 | 46.13 | 45.97 | 49.0 | 46.1 | 47.1 | 48.1 | 45.48 | 53.51 | 60.57 |
| Formaldehyde | 0.23 | 0.23 | 0.23 | 0.23 | 0.23 | 0.23 | 0.56 | 0.56 | 0.23 | 0.23 | 0.23 | 0.23 | 0.23 | — | — |
| Acrylic polymer[1] emulsion (non-film forming) | 8.0 | 8.0 | 7.60 | 7.60 | 7.60 | 8.68 | 8.22 | 8.22 | 7.6 | 8.22 | 8.22 | 8.22 | 8.22 | — | — |
| Acrylic copolymer[5] emulsion (film forming) (38% solids) | 35.0 | 35.0 | 33.40 | 33.40 | 33.40 | 38.12 | — | — | — | — | — | — | — | — | — |
| Ammonium hydroxide | (to 9.5) | (to 9.5) | (to 9.5) | (to 9.5) | (to 9.5) | (to 8.0) | 0.20 | 0.21 | (to 9.5) | (to 8.0) | (to 8.0) | (to 8.0) | 0.21 | 0.16 | 0.16 |
| Diethylene glycol monoethyl ether | 3.5 | 2.0 | 3.5 | 4.5 | 5.5 | 5.14 | 4.0 | 4.0 | 4.5 | 4.0 | 4.0 | 4.0 | 4.85 | 3.77 | 3.77 |
| Isopropanol | 4.5 | 6.0 | 4.5 | 3.5 | 2.5 | 3.99 | 4.0 | 4.0 | 3.5 | 4.0 | 3.0 | 2.0 | 4.00 | 3.11 | 3.11 |
| Tris-butoxyethyl phosphate | 0.75 | 0.75 | 0.75 | 0.75 | 0.75 | 0.85 | 0.7 | 0.8 | 0.75 | 0.81 | 0.81 | 0.81 | 0.8 | 0.62 | 0.62 |
| Fluorocarbon surfactant[4] | 0.05 | 0.05 | 0.05 | 0.05 | 0.05 | 0.06 | 0.04 | — | 0.05 | 0.06 | 0.06 | 0.06 | 0.04 | 0.03 | 0.03 |
| Fragrance | 0.75 | 1.0 | 0.75 | 0.75 | 0.75 | 0.75 | 0.03 | — | 0.75 | 0.30 | 0.30 | 0.30 | — | — | — |
| Acrylic copolymer emulsion[6] (film forming) | — | — | — | — | — | — | 36.12 | 36.12 | — | — | — | — | — | — | — |
| Acrylic copolymer emulsion[7] (film forming) | — | — | — | — | — | — | — | — | 33.4 | 36.11 | 36.11 | 36.11 | — | — | — |
| Fluorocarbon surfactant[8] | — | — | — | — | — | — | — | 0.12 | — | — | — | — | — | — | — |
| Preservative[3] | — | — | — | — | — | — | — | — | — | — | — | — | 0.05 | 0.05 | 0.05 |
| Acrylic copolymer emulsion (film forming) (40% solids)[2] | — | — | — | — | — | — | — | — | — | — | — | — | 36.12 | 28.09 | 28.09 |
| Styrene-maleic anhydride (non-film forming) (15% solution)[9] | — | — | — | — | — | — | — | — | — | — | — | — | — | 10.66 | — |
| Acrylic polymer emulsion (non-film forming) (45% solution)[10] | — | — | — | — | — | — | — | — | — | — | — | — | — | — | 3.6 |

[1] Richamer R-900 supplied by The Richardson Co.
[5] Richamer R-900 supplied by The Richardson Co.
[6] Copolymer 136-68A supplied by The Richardson Co.
[7] Copolymer 136-68B supplied by The Richardson Co.
[8] Lodyne surfactant supplied by CIBA-GEIGY Corp.
[9] SMA-2625-A supplied by ARCO Corp.
[10] Acrysol 527 supplied by Rohm & Haas The performance characteristics exhibited by these formulations were comparable to those exhibited by the composition of Example 1 in terms of cleaning ability and postapplication protection.

EXAMPLE 17

The following example illustrates the broad range of excellent performance characteristics exhibited by a typical composition of this invention.

The following characteristics are specific to formulation 1.

| | |
|---|---|
| pH | 8.2 |
| % solids | 13.5% |
| appearance | translucent white liquid |
| Film color on clear glass | clear |
| Film color on black glass | no haze |
| Metal glide adhesion[1] | pass |
| Freeze-thaw stability[2] | pass - 3 cycles |
| 110° F. oven stability[3] | pass - 3 months |
| 130° F. oven stability | pass - 6 weeks |
| Soil resistance | excellent |

[1] Test simulates effects of the metal glider on the bottom of tables and chairs on the newly protected surface. A "pass" rating indicates no damage to substrate.
[2] The sample is stored at 0° F. for a period of 24 hours and then maintained at room temperature for a period of 24 hours. The sample is visually observed to determine separation, gellation and/or color change. The substantial absence of these indicia after three cycles is indicative of freeze-thaw stability.
[3] The sample is stored at the indicated temperature for the predetermined time. Visual inspection is conducted weekly. The substantial absence of separation, gellation, color change is indicative of heat stability.

As noted from the tabulated results, the instant formulation shows to distinct advantage in virtually all of the indicated criteria.

Summarizing, it is seen that this invention provides an improved, floor care composition.

Variations may be made in proportions, procedures and materials without departing from the scope of the invention as defined by the following claims.

What is claimed is:

1. An aqueous composition for application to a substrate to clean said substrate and provide a substantially clear, glossy, protective finish thereon comprising an aqueous phase;

from about 20.0–50.0% of a non-volatile, solid, film-forming acrylic polymer;

from about 5.0–20.0% of a non-film forming resinous material selected from the group consisting of aldehyde/ketone resins, esters of polyacrylic acid and $C_1$–$C_4$ alkanols, polyacrylic resins, esters of monomeric resin acids, condensation products of monomeric resin acids, polyesters of organic non-resinous polycarboxylic acids and monomeric polyhydric alcohols, phenol-formaldehyde polycondensates, melamine-formaldehyde condensates, urea-formaldehyde resins and styrene resins; said film-forming and non-film forming materials being dispersed in said aqueous phase;

from about 0.5–2.0% of a plasticizer;

from about 0.01–1.0% of a fluorocarbon surface active agent; wherein the improvement comprises from about 2.0–10.0% of an ether alcohol; and from about 2.0–10.0% of isopropanol; the percentages being based on the total weight of the composition.

2. The composition of claim 1, wherein said non-film forming resinous material is a polyacrylic resin.

3. The composition of claim 1, wherein the total solids content thereof is from about 10–20%, based on the weight of said composition.

4. The composition of claim 1, wherein said ether alcohol in diethylene glycol monoethyl ether.

5. The composition of claim 1, wherein the pH of the composition is from about 7.5–11.5, said pH level being attained by the addition of an alkaline agent to said composition.

6. The composition of claim 1, wherein said film-forming and non-film forming materials are in emulsion form.

7. The composition of claim 1 comprising a film-forming acrylic polymer emulsion, a non-film forming polyacrylic resin emulsion, diethylene glycol monoethyl ether, isopropanol, tris-butoxyethyl phosphate, a fluorocarbon surfactant, a preservative and water, said composition having a pH of 8.2 and a total solids content of 13.5%, by weight.

* * * * *